(12) United States Patent
Axe et al.

(10) Patent No.: US 9,469,065 B2
(45) Date of Patent: Oct. 18, 2016

(54) PROCESS FOR FORMING A SHEET OF THERMOPLASTIC MATERIAL

(75) Inventors: Suzanne Emma Axe, Sharnbrook (GB); Adrian Michael Woodward, Bury St. Edmonds (GB)

(73) Assignee: Conopco, Inc., Englewood Clffs, NJ (US)

( * ) Notice: Subject to any disclaimer, the term of this patent is extended or adjusted under 35 U.S.C. 154(b) by 400 days.

(21) Appl. No.: 14/005,571

(22) PCT Filed: Mar. 22, 2012

(86) PCT No.: PCT/EP2012/055075
§ 371 (c)(1),
(2), (4) Date: Oct. 22, 2013

(87) PCT Pub. No.: WO2012/126982
PCT Pub. Date: Sep. 27, 2012

(65) Prior Publication Data
US 2014/0042667 A1    Feb. 13, 2014

(30) Foreign Application Priority Data
Mar. 23, 2011   (EP) ..................... 1159346

(51) Int. Cl.
*B29C 33/40*    (2006.01)
*B29C 51/00*    (2006.01)
(Continued)

(52) U.S. Cl.
CPC .............. *B29C 51/00* (2013.01); *B29C 51/04* (2013.01); *B29C 51/08* (2013.01); *B29C 2791/001* (2013.01)

(58) Field of Classification Search
CPC ... B29C 67/0029; B29C 43/16; B29C 43/14; B21D 22/206
See application file for complete search history.

(56) References Cited

U.S. PATENT DOCUMENTS

| 2,444,420 A | 7/1948 | Borkland |
| 3,020,596 A | 2/1962 | Clapp |

(Continued)

FOREIGN PATENT DOCUMENTS

| DE | 10257144 | 6/2004 |
| DE | 10257144 A1 | 6/2004 |

(Continued)

OTHER PUBLICATIONS

PCT International Search Report in PCT application PCT/EP2012/055075 dated Jun. 18, 2012 with Written Opinion.

(Continued)

*Primary Examiner* — Galen Hauth
(74) *Attorney, Agent, or Firm* — Ellen Plotkin

(57) ABSTRACT

Provided is a process for forming a sheet of thermoplastic material into a three-dimensional shape, the process comprising the steps of (i) forming the sheet at a temperature below its glass transition temperature to produce a first formed shape in the sheet, followed by (ii) raising the temperature of the first formed shape (20) to above its glass transition temperature whilst a male former (12), having at least a portion of its profile being substantially the same as that of the first formed shape (20), is positioned to substantially align at least a portion of its profile with that of the first formed shape (20), thereby restricting the first formed shape from shrinking back towards its original sheet form, followed by (iii) further forming the first formed shape (20) at a temperature below that of the glass transition temperature, to form a second formed shape (24), followed by (iv) raising the temperature of the second formed shape (24) to above its glass transition temperature whilst a male former (16), at least a portion of its profile being substantially the same as that of the second formed shape (24), is positioned to substantially align at least a portion of its profile with that of the second formed shape (24), thereby restricting the second formed shape (24) from shrinking back towards its original sheet form.

11 Claims, 1 Drawing Sheet

(51) Int. Cl.
  *B29C 51/04*  (2006.01)
  *B29C 51/08*  (2006.01)

(56) References Cited

U.S. PATENT DOCUMENTS

| | | | | |
|---|---|---|---|---|
| 3,487,139 | A | * | 12/1969 | Ayala .................... B29C 43/361 264/132 |
| 3,947,539 | A | * | 3/1976 | Lane ................... B29C 67/0029 264/292 |
| 4,555,378 | A | * | 11/1985 | Martin .................... B29C 51/08 264/219 |
| 5,249,447 | A | | 10/1993 | Aizawa et al. |
| 6,391,237 | B1 | * | 5/2002 | Kearney ............... B29C 33/424 264/132 |

FOREIGN PATENT DOCUMENTS

| WO | WO9501907 | 1/1995 |
|---|---|---|
| WO | WO2004033303 | 4/2004 |

OTHER PUBLICATIONS

European Search Report in EP application EP 11 15 9346 dated Oct. 14, 2011 with Written Opinion.

* cited by examiner

PROCESS FOR FORMING A SHEET OF THERMOPLASTIC MATERIAL

TECHNICAL FIELD OF THE INVENTION

The present invention relates to the manufacture of formed thermoplastic, in particular to infusion packets such as tea bags having a pre-determined three-dimensional shape.

BACKGROUND TO THE INVENTION

For many years infusion packets, such as tea bags were available primarily as square or round two-ply sheets of porous filter material, typically made of paper, with the infusible material, such as tea, sandwiched between the sheets. Such packets restrict the flow of infusible material within the packet substantially to two dimensions. As a result the infusion performance of such packets is limited.

Thus the past few decades have seen the development of mass-produced infusion packets which have a more three-dimensional shape and which allow the infusible substance more room to move. Of particular success have been the tetrahedral-shaped packets such as those described in the international patent applications published as WO 95/01907 (Unilever) and WO 2004/033303 (I.M.A. SPA).

In the manufacture of tetrahedral packets, the tetrahedral shape is conventionally formed by making mutually perpendicular transverse seals in a tube of filter material and apparatus designed for such manufacture is ill-suited to the manufacture of other three-dimensional shapes.

Therefore, it would be desirable to develop a process which can manufacture a variety of three-dimensional shapes.

DEFINITIONS

It should be noted that in specifying any range of values, any particular upper value can be associated with any particular lower value.

For the avoidance of doubt, the word "comprising" is intended to mean "including" but not necessarily "consisting of" or "composed of". In other words, the listed steps or options need not be exhaustive.

The disclosure of the invention as found herein is to be considered to cover all embodiments as found in the claims as being multiply dependent upon each other irrespective of the fact that claims may be found without multiple dependency or redundancy.

SUMMARY OF THE INVENTION

The inventors have realised that known thermoforming processes, whilst capable of generating a variety of three-dimensional shapes, are not suitable for use with infusion packet material.

Firstly, infusion packets are most commonly made of paper, which is not thermoformable. Secondly, even if they were made from a thermoformable material, they would be inappropriate for thermoforming due to their porosity and thinness of the material.

Known thermoforming processes involve a first step of heating the material followed by a second step of thermoforming the material. The very small heat capacity of infusion packet material means that any heating will quickly be lost and so this approach will not work.

Even if a way of solving the heating problem could be found, the porosity of the material prevents the use of air pressure to form the material. Known thermoforming techniques typically involve the use of air pressure to form the material. However, the porosity of infusion packet material makes this approach impractical, as any difference in air pressure across the material will quickly equalise.

If air pressure is not used, and a mould was pressed into the material then only a limited number of three-dimensional shapes could be formed due to the fragility of any porous and thin infusion packet material.

Thus, it would seem that thermoforming is not a practical method of generating a wide variety of three-dimensional shapes from infusion packet material.

However, surprisingly the present inventors have overcome these barriers and developed a forming process that can produce a wide variety of three-dimensional shapes and is particularly suitable for forming infusion packet material.

Thus, the invention relates to a process for forming a sheet of thermoplastic material into a three-dimensional shape, the process comprising the steps of:

(i) forming the sheet at a temperature below its glass transition temperature to produce a first formed shape in the sheet, followed by (ii) raising the temperature of the first formed shape to above its glass transition temperature whilst a male former, having at least a portion of its profile being substantially the same as that of the first formed shape, is positioned to substantially align at least a portion of its profile with that of the first formed shape, thereby restricting the first formed shape from shrinking back towards its original sheet form, followed by (iii) further forming the first formed shape at a temperature below that of the glass transition temperature, to form a second formed shape, followed by (iv) raising the temperature of the second formed shape to above its glass transition temperature whilst a male former, at least a portion of its profile being substantially the same as that of the second formed shape, is positioned to substantially align at least a portion of its profile with that of the second formed shape, thereby restricting the second formed shape from shrinking back towards its original sheet form.

Thus, the invention involves a first step of cold forming the thermoplastic material, followed by a second step of heating, which causes the internal stresses in the thermoplastic material to reduce, without any shrink-back of the material. This reduction in internal stress then permits a third step of further cold forming, followed by a fourth step of heating to further reduce the internal stresses without shrink-back of the material.

In this way the thermoplastic sheet can be formed further than in known processes involving only one forming step, as the second step of heating allows further forming to an extent which would not be possible in the first forming step alone.

Thus, even very thin and porous material can be formed into a wide variety of three-dimensional shapes according to the process of the present invention.

Therefore, preferably the thermoplastic material has an average thickness of less than 1.0 mm, preferably less than 0.50 mm, more preferably less than 0.2 mm, most preferably from 0.01 to 0.1 mm.

Also, preferably the thermoplastic material is gas permeable. For example, it may comprise filaments of thermoplastic material in a fabric form.

The first step of forming the sheet of thermoplastic material may be carried out by any known forming process known in the art, provided the material is below its glass transition temperature. However, preferably the first formed shape is formed by a male former, so that the first formed shape adopts the profile of the male former.

Once the first formed shape has been formed, the sheet of thermoplastic material is heated to above its glass transition temperature whilst prevented from shrinking back to its original form by the presence of a male former in contact with the first formed shape.

The third step of forming the sheet of thermoplastic material may be carried out by any known forming process known in the art, provided the material is below its glass transition temperature. However, preferably the second formed shape is formed by a male former, so that the second formed shape adopts the profile of the male former.

In a preferred embodiment, the second formed shape is formed by a male former and is the same male former as is employed in the first step of forming the first formed shape.

In a further step, once the second formed shape has been formed, the sheet of thermoplastic material is heated to above its glass transition temperature whilst prevented from shrinking back to its original form by the presence of a male former in contact with the second formed shape.

In a preferred embodiment, the male former employed in the fourth step of heat treatment is the same male former as is employed in the second step of heat treatment.

The heat treatment steps can be carried out in a wide variety of ways, however a preferred method of heating the thermoplastic material is to direct a heated gas stream onto the thermoplastic material. This is particularly effective if the material is porous and relatively thin, as the low heat capacity of the material results in a short heating time.

In this embodiment, typically the first formed shape is formed by a male former and is the same male former as is employed in the second step of heat treatment.

Alternatively, heating can be achieved by employing a heated male former at a temperature in excess of the glass transition temperature of the thermoplastic material in the second and/or fourth step. In order to prevent the need for heating and cooling the same male former, in this embodiment it is preferable to employ a cold male former and a separate heated male former.

Thus, the first and/or third step would employ the cold male former and the second and/or fourth step would employ the heated male former.

The temperature of the thermoplastic material in the second step and/or the fourth step is preferably greater than 100° C., more preferably greater than 120° C., most preferably from 130° C. to 200° C. As discussed above, this can be achieved at least by directing gas at a temperature in excess of these levels or by employing a male former at a temperature in excess of these levels.

Whilst the present process requires two steps of forming the thermoplastic material, the present invention allows for further steps of forming followed by heating to be carried out. This can result in even more deformation of the thermoplastic material and can therefore produce a wider variety of three-dimensional shapes.

The thermoplastic material can be made form a wide variety of materials, however polyethylene terephthalate and poly lactic acid are preferred.

The process according to the present invention is capable of generating three-dimensional shapes which can then be used as infusion packet material. For example, shapes such as tetrahedral, hemispherical and the like are possible.

Thus, the process is generally followed by the step of depositing a particulate product, typically comprising infusible entities such as tea leaves, into the formed thermoplastic material. This step is then typically followed by sealing the formed material to produce a sealed porous infusion packet.

The invention will now be illustrated by way of example and with reference to the following figures, in which.

Figure 1:
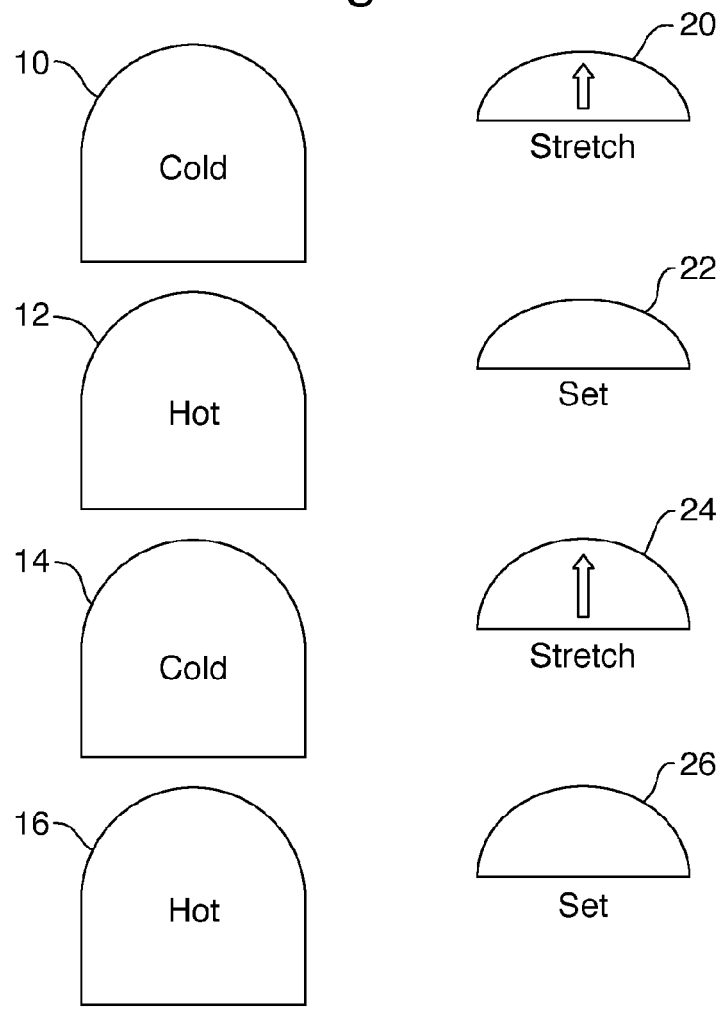
FIG. 1 is a schematic representation of a process according to the present invention.

Turning to the figures, FIG. 1 shows a male former 10 and a first formed shape 20 of polyethylene terephthalate woven material. For clarity the former 10 and the shape 20 are shown as separated but the shape 20 would be in contact with the former 10. The first formed shape 20 has been formed by former 10 pressing into a flat sheet if polyethylene terephthalate at room temperature.

Once formed, male former 10 is withdrawn and replaced by heated male former 12 at a temperature of 150° C., which has the same profile as male former 10. This temperature is sufficient to cause the first formed shape 20 to be heated by conduction to produce the heated first formed shape 22, also at 150° C. As this is above the glass transition temperature of the thermoplastic material, this results in a reduction of the internal stresses generated during the forming of the first formed shape 20.

The heated former 12 is then withdrawn and replaced by a cool male former 14. Male former 14 may be the same male former as the male former 10 employed in the first step. The temperature of the thermoplastic material then reduces to room temperature by contact with male former 14.

A further step of forming the polyethylene terephthalate material then begins, which results in the second formed shape 24.

The male former 14 is then withdrawn and replaced with heated male former 16, which is at a temperature of 150° C. This raises the temperature of the second formed shape 24 by contact with the male former 16 to produce heated second formed shape 26, which is also at 150° C. Male former 16 may be the same male former as the male former 12 employed in the second step.

The resulting shape, which is approximately hemispherical in shape can then be used as infusion packet material, filled with infusible particulate entities and sealed to form a porous packet.

As the material has been effectively annealed at 150° C., it will not shrink back from its formed shape at all temperatures up to 150° C.

Figure 2:
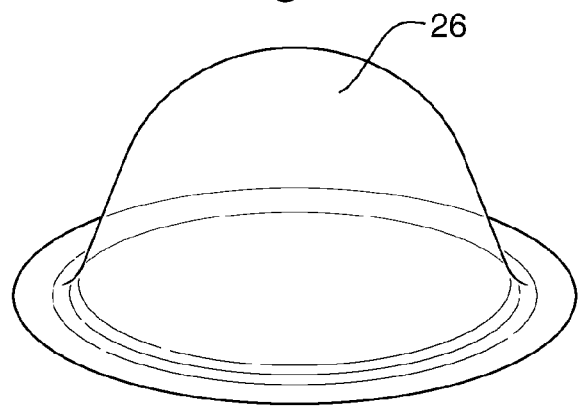
FIG. 2 is an image of a three-dimensional shape formed by a process according to the present invention.

FIG. 2 shows an image of such a hemispherical polyethylene terephthalate formed shape 26.

The invention claimed is:

1. A process for forming a sheet of thermoplastic material into a three-dimensional shape, the process comprising the steps of:
   (i) starting with a thermoplastic material having an average thickness of less than about 1.0 mm;
   (ii) forming the sheet at a temperature below its glass transition temperature to produce a first formed shape in the sheet, followed by
   (iii) raising the temperature of the first formed shape to above its glass transition temperature, to over 100° C.; while a male former, having at least a portion of its profile being substantially the same as that of the first formed shape, is positioned to substantially align at least a portion of its profile with that of the first formed shape, thereby restricting the first formed shape from shrinking back towards its original sheet form, followed by (iv) further forming the first formed shape at a temperature below that of the glass transition temperature, to form a second formed shape, followed by (v) raising the temperature of the second formed shape to above its glass transition temperature, to over 100° C.; while a male former, at least a portion of its profile being substantially the same as that of the second formed shape, is positioned to substantially align at least a portion of its profile with that of the second formed shape, thereby restricting the second formed shape from shrinking back towards its original sheet form;

wherein the male former employed in step (v) is the same male former as employed in step (iii); and wherein the thermoplastic material is heated to above its glass transition temperature by directing a heated as stream onto said thermoplastic material.

2. A process according to claim 1 wherein the thermoplastic material has an average thickness of less than about 0.50 mm, optionally less than 0.2 mm, optionally less than 0.1 mm.

3. A process according to claim 1, wherein the thermoplastic material is gas permeable.

4. A process according to claim 3, wherein the thermoplastic material has a fabric form.

5. A process according to claim 1, wherein the first formed shape is formed by a male former in step (ii).

6. A process according to claim 1, wherein the second formed shape is formed by a male former in step (iv).

7. A process according to claim 5, wherein the male former employed in step (iv) is the same male former as employed in step (ii).

8. A process according to claim 1, wherein the first formed shape is formed by a male former in step (ii) and is the same male former as employed in step (iii).

9. A process according to claim 1, wherein the first formed shape is formed by a first male former in step (ii), and step (iii) employs a second male former at a temperature greater than that of the glass transition temperature of the thermoplastic material.

10. A process according to claim 1, which is followed by further steps of forming the thermoplastic material below its glass transition temperature and subsequently raising the temperature of the formed shape to above its glass transition temperature whilst a male former, at least a portion of its profile being substantially the same as that of the formed shape, is positioned to substantially align at least a portion of its profile with that of the former shape.

11. A process according to claim 1, wherein the thermoplastic material comprises polyethylene terephthalate.

* * * * *